United States Patent
Yamamoto

(10) Patent No.: US 6,823,071 B2
(45) Date of Patent: Nov. 23, 2004

(54) FREQUENCY MODULATION MULTIPLEX DEMODULATION DEVICE

(75) Inventor: Yuji Yamamoto, Saitama (JP)

(73) Assignee: Pioneer Corporation, Tokyo (JP)

( * ) Notice: Subject to any disclaimer, the term of this patent is extended or adjusted under 35 U.S.C. 154(b) by 590 days.

(21) Appl. No.: 09/822,476

(22) Filed: Apr. 2, 2001

(65) Prior Publication Data

US 2001/0026620 A1 Oct. 4, 2001

(30) Foreign Application Priority Data

Mar. 31, 2000 (JP) ........................................ 2000-099767

(51) Int. Cl.[7] .............................................. H04H 5/00
(52) U.S. Cl. .............................................. 381/2; 381/3
(58) Field of Search .......................... 381/2, 3, 14, 15, 381/16; 455/42, 45, 205

(56) References Cited

U.S. PATENT DOCUMENTS 4,032,717 A * 6/1977 Mallon ........................ 381/11
5,068,896 A * 11/1991 Short ........................... 381/13
5,740,523 A * 4/1998 Nakajima et al. ........ 455/186.1

* cited by examiner

Primary Examiner—Xu Mei
Assistant Examiner—Justin Michalski
(74) Attorney, Agent, or Firm—Sughrue Mion, PLLC

(57) ABSTRACT

A frequency modulation (FM) multiplex demodulation device is provided, in which the feeling of stereo is maintained excellent and the offensive noise to the ears can be reduced. The FM multiplex demodulation device includes: a filter for selecting a signal multiplexed by a subcarrier at 38 kHz from a composite signal; a noise detecting section for detecting noises from the composite signal; a ratio changing section for changing a composition ratio between an output signal from the filter and the composite signal, and for outputting a composed signal, the composition ratio being determined in response to the noises detected by the noise detecting section; a demodulating section for demodulating the multiplexed signal with multiplying the output signal from the ratio changing section by the subcarrier; an adding section for adding an output signal from the demodulating section to the composite signal; and a subtracting section for subtracting the output signal from the demodulating section from the composite signal.

8 Claims, 3 Drawing Sheets

FREQUENCY MODULATION MULTIPLEX DEMODULATION DEVICE

BACKGROUND OF THE INVENTION (1) Field of the Invention

This invention relates to a frequency modulation (hereinafter, FM) multiplex demodulation device, by which a (L−R) signal multiplexed by a subcarrier at 38 kHz is demodulated to a (L+R) signal contained in a composite signal (FM detected signal) so that a L signal and R signal are obtained.

(2) Description of the Related Art

As to a FM stereo broadcast, a (L−R) signal is demodulated to a (L+R) signal by a subcarrier at 38 kHz in a FM-detected baseband as shown in FIG. 5A.

So far, a FM multiplex demodulation device shown in FIG. 6 has been used to obtain a L signal and R signal by demodulating such a multiplexed signal.

As shown in FIG. 6, the conventional FM multiplex demodulation device consists of a demodulator 50 for demodulating the multiplexed (L−R) signal shown in FIG. 5A, a noise detecting section 51 for detecting a noise level contained in the composite signal, an attenuator (ATT) 52 for attenuating the demodulated (L−R) signal, an adding section 53, and a subtracting section 54.

When the composite signal is received, in a state that a multipass fading exists, noise in a FM-detected output increases, the noise detecting section 51 detects the noise level and changes an attenuation quantity by the attenuator 52 in response to the detected noise level. Therefore, when the noise is not detected, the attenuation quantity by the attenuator 52 becomes to be zero.

As to the demodulator 50, when the subcarrier at 38 kHz is added to the signal shown in FIG. 5A, the (L−R) signal shown in FIG. 5B is demodulated.

At the adding section 53, the signal shown in FIG. 5B is added to the signal shown in FIG. 5A to obtain 2L signal, while the signal shown in FIG. 5B is subtracted from the signal shown in FIG. 5A to obtain 2R signal, each of which is input into a speaker (not shown in the figure).

The added or subtracted output contains multiplexed subcarrier components, which are not in an audio frequency band and not reproduced from a speaker.

When a noise is detected at the noise detecting section 51, an output at the adding section 53 is equal to $$(L+R)+k'(L-R)=(1+k')L+(1-k')R$$

and an out put at the subtracting section 54 is equal to $$(L+R)-k'(L-R)=(1-k')L+(1+k')R$$

where k' ($0 \leq k' \leq 1$) is the attenuation quantity at the attenuator 52. Consequently, it takes effect a reduction in multipass noise, however a feeling of stereo deteriorates at the same time, causing a deterioration of the tone quality.

SUMMARY OF THE INVENTION

It is therefore an objective of the present invention to solve the above problem and to provide a FM multiplex demodulation device, in which the feeling of stereo is maintained excellent and the offensive noise to the ears can be reduced.

In order to attain the above objective, the present invention is to provide a FM multiplex demodulation device comprising: a filter for selecting a signal multiplexed by a subcarrier at 38 kHz from a composite signal; a noise detecting section for detecting noises from the composite signal; a ratio changing section for changing a composition ratio between an output signal from the filter and the composite signal, and for outputting a composed signal, the composition ratio being determined in response to the noises detected by the noise detecting section; a demodulating section for demodulating the multiplexed signal with multiplying the output signal from the ratio changing section by the subcarrier; an adding section for adding an output signal from the demodulating section to the composite signal; and a subtracting section for subtracting the output signal from the demodulating section from the composite signal.

The FM multiplex demodulation device further comprises a delaying section for delaying the composite signal for a period of time corresponding to a delay time of the filter, wherein the delayed signal instead of the composite signal is input to the ratio changing section, the adding section and the subtracting section.

The filter filters out a part of a multiplexed signal.

The filter consists of a second-order band-pass infinite impulse response (hereinafter IIR)-type digital filter, a sampling frequency of the digital filter is set to be six times of a center frequency of the pass band, a first-order input feed back coefficient $b_1$ is set as $b_1=-1+2^{-n}$, while a second-order input feed back coefficient $b_2$ is set as $b_2=1-2^{-(n-1)}$, where n is 3 or an odd number more than 3.

A zero-order output coefficient $a_0$ is set as $a_0=2^{-n}$ and a second-order output coefficient $a_2$ is set as $a_2=-2^{-n}$.

A second-order output is subtracted from a zero-order output and the resultant output is multiplied by $2^{-n}$.

DESCRIPTION OF THE PREFERRED EMBODIMENTS

In the following, a preferred embodiment of the present invention will be explained with reference to FIG. 1, which illustrates a constitution of a FM multiplex demodulation device according to the preferred embodiment.

Figure 1:
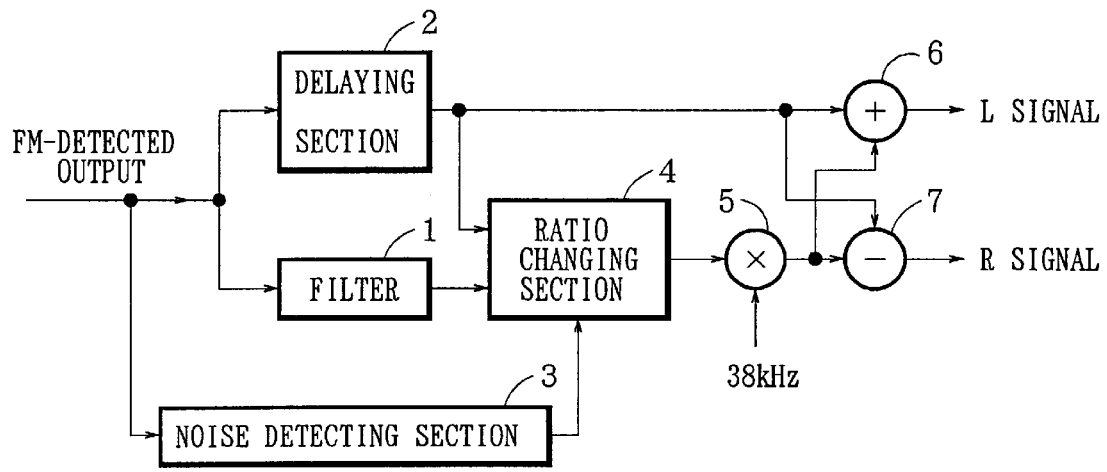
FIG. 1 is a constitution of a FM multiplex demodulation device according to a preferred embodiment of the present invention.

As shown in FIG. 1, the FM multiplex demodulation device includes a filter 1, a delaying section 2 for delaying a composite signal for a period of time for the signal to pass through the filter 1, a noise detecting section 3, a ratio changing section 4 for changing a composition ratio between an output signal from the delaying section 2 and an output signal from the filter 1, a demodulating section 5, an adding section 6, and a subtracting section 7.

Figure 5A:
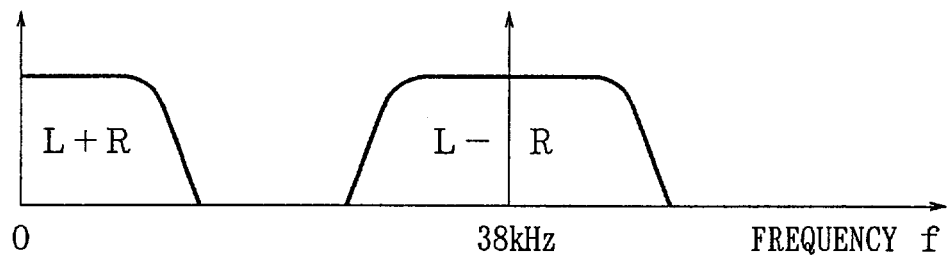
FIGS. 5A and 5B are graphs illustrating a FM-detected output signal and a demodulated output signal.
Figure 5B:
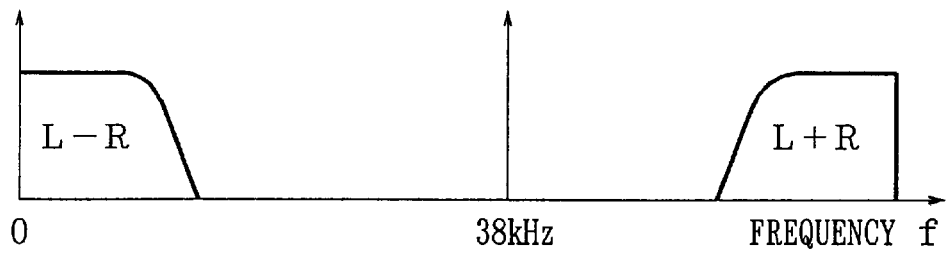
Figure 6:
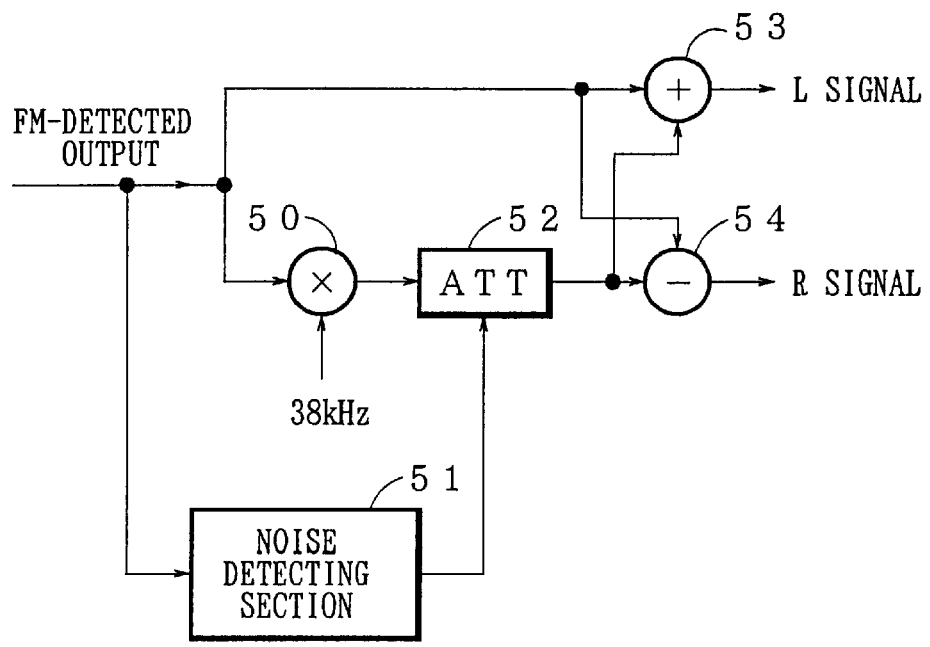
FIG. 6 is a constitution of a conventional FM multiplex demodulation device.

The filter 1 is for passing the multiplexed (L−R) signal explained by using FIG. 5A through, a center frequency of which is 38 kHz of a subcarrier, and the signal attenuates with being away from 38 kHz.

Since the output signal from the delaying section 2, which is input to the ratio changing section 4, is delayed at the delaying section 2, a phase and an amplitude of the output signal are the same as those of an output signal from the filter 1 having the center frequency, respectively.

Assuming that the composition ratio is k, at the ratio changing section 4, a signal is composed by a ratio as follows:

output from the filter is equal to k (L−R)·H(S) where H(S) is a transfer function of the filter 1; and output from the delaying section is equal to (1−k) (L−R), wherein a (L−R) signal modulated by the subcarrier at 38 kHz is output.

Consequently, a signal 2L is output from the adding section 6 when the composition ratio k is equal to zero, while a signal 2R is output from the subtracting section 7 when the composition ratio k is equal to zero, thereby the feeling of stereo is maintained excellent without deteriorating a separation of L and R.

When a noise level at the noise detecting section 3 increases due to a multipass fading, k approaches one from zero, thereby an output from the ratio changing section 4 is dominated by an output signal from the filter 1, which has the transfer function H (S).

Since the output signal from the filter 1 attenuates with being away from 38 kHz of the center frequency of the filter 1, therefore a noise of high frequencies is cut off, an offensive noise arising in the high frequency parts in a sound reproduced by a speaker is reduced, and a separation in the low frequency parts can be maintained excellent, thereby the feeling of stereo can be maintained excellent.

The offensive noise further can be reduced by narrowing the pass band of the filter 1.

In addition to a change in the ratio at the ratio changing section 4, the pass band width of the filter 1 may be changed by the output from the noise detecting section 3.

In the following, a constitution of the filter 1 according to the present invention will be explained.

When the FM multiplexed demodulation device according to the present invention is realized by a digital signal conditioning, a phase and an amplitude of the output signal from the delaying section 2 must be the same as those of the output signal from the filter 1, respectively.

Therefore, in the present invention, the filter 1 consists of a second-order IIR (Infinite Impulse Response)-type digital filter.

Figure 4:
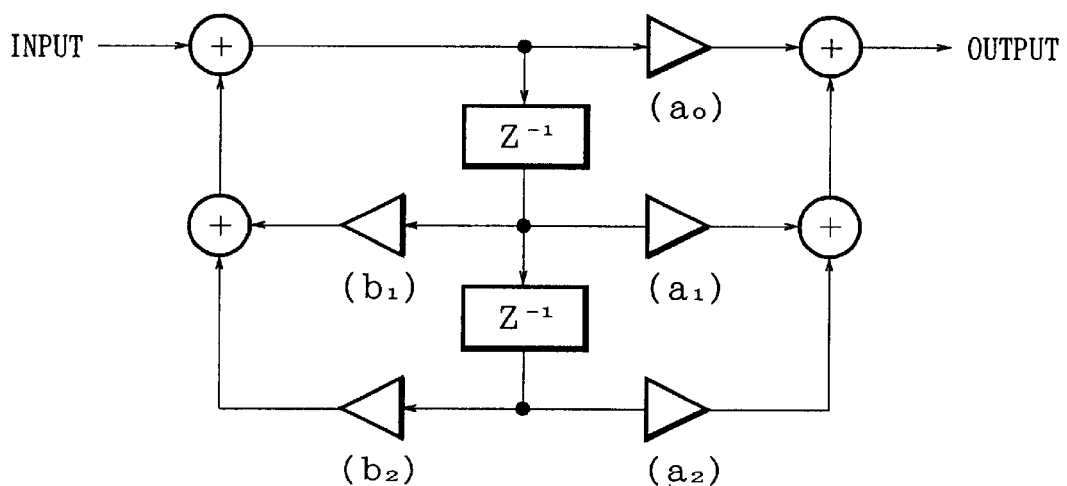
FIG. 4 is a constitution of a second-order band-pass IIR-type digital filter.

FIG. 4 shows a constitution of a general second-order IIR-type digital filter.

A transfer function H (Z) in FIG. 4 is expressed by the equation:

$$H(Z)=(a_0+a_1Z^{-1}+a_2Z^{-2})/(1+b_1Z^{-1}+b_2Z^{-2}), \quad (1)$$

an amplitude characteristic M ($\omega$) is expressed by the equation:

$$M(\omega)=(O/Q)^{0.5}, \quad (2)$$

a delay characteristic $\tau(\omega)$ is expressed by the equation:

$$\tau(\omega)=(P/O-R/Q)T, \quad (3)$$

where:

$$O=A^2+C^2$$

$$P=C(C+a_2 \sin 2\omega T)-A(A-a_0+a_2 \cos 2\omega T)$$

$$Q=B^2+D^2$$

$$R=D(D+b_2 \sin 2\omega T)+B(B-1+b_2 \cos \omega T)$$

$$T=\text{sampling time} \quad (4)$$

$$A=a_0+a_1 \cos \omega T+a_2 \cos 2\omega T$$

$$B=1+b \cos \omega T+b_2 \cos 2\omega T$$

$$C=a_1 \sin \omega T+a_2 \sin 2\omega T$$

$$D=b_1 \sin \omega T+b_2 \sin 2\omega T. \quad (5)$$

Here, for a general second-order band-pass filter, it follows that $$a_1=0, \text{ and}$$

$$a_0=-a_2. \quad (6)$$

When the sampling frequency $f_s$ (=1/T) is set to be six times of a center frequency $f_c$ of the band pass filter, it follows that $$\omega_c T=2\pi f_c T=\pi/3 \quad (7)$$

$$2\omega_c T=2\pi/3 \quad (8)$$

$$\cos 2\omega T=-\cos \omega T \quad (9)$$

$$\sin 2\omega T=\sin \omega T \quad (10)$$

$$2 \cos \omega T=1. \quad (11)$$

Consequently, assuming that $$a_0=a, \text{ and } a_2=-a, \quad (12)$$

it follows that $$A=a+a \cos \omega T$$

$$B=(2+b_1-b_2)\cos \omega T$$

$$C=-a \sin \omega T$$

$$D=(b_1+b_2)\sin \omega T. \quad (13)$$

Consequently, in equation (4) it follows that $$O=2a^2(1+\cos \omega T)$$

$$Q=(2+b_1-b_2)^2 \cos^2 \omega T+(b_1+b_2)^2 \sin^2 \omega T$$

$$P=2a^2(\sin^2 \omega T-\cos^2 \omega T-\cos \omega T)$$

$$R=(b_1+b_2)(b_1+2b_2)\sin^2 \omega T+(2+b_1-b_2)(b_1-2b_2)\cos^2 \omega T \quad (14)$$

Then, assuming that $$b_1=-(1-a), \text{ and}$$

$$b_2=1-2a, \quad (15)$$

it follows that $$b_1+b_2=-a$$

$$b_1+2b_2=1-3a$$

$$2+b_1-b_2=3a$$

$$b_1-2b_2=-3+5a. \quad (16)$$

When equation (16) is substituted for Q and R in equation (14), it follows that $Q = 9a^2 \cos^2 \omega T + a^2 \sin^2 \omega T$ $R = -a(1-3a)\sin^2 \omega T + 3a(-3+5a)\cos^2 \omega T.$ (17)

From equation (7), it follows that $\cos^2 \omega T = 1/4$, and $\sin^2 \omega T = 3/4$, (18)

thereby it follows that $O = 3a^2$ $P = 0$ $Q = 3a^2$ $R = 3a(2a-1).$ (19)

Therefore, when equation (19) is substituted for equations (2) and (3), it follows that $M(\omega) = (O/Q)^{0.5} = 1$ (20)

$\tau(\omega) = (P/0 - R/Q)T = (1-2a)/6af_c.$ (21)

Then, assuming that $a = 2^{-n}$ (n: an integer and equal to or more than zero), (22)

it follows that $\tau(\omega) = (2^n - 2)/f_c.$ (23)

Then, assuming that $n = 3, 5, 7, 9, \text{---}$ (n: positive odd number except 1), (24)

it follows that $\tau(\omega)f_c = 1, 5, 21, 85, \text{---}.$ (25)

Thereby, an amount of group delay can be set an integer times of $1/f_c$, therefore a phase of the center frequency of the input coincides with that of the output.

Assuming that $n = 2m+1$ (m: integer and more than 0), (26)

equation (23) can be expressed by the equation:

$\tau(\omega) = (2^{2m} - 1)/3f_c.$ (27)

When n is expressed by equation (26), a in equation (22) is expressed by the equation:

$a = 2^{-(2m+1)},$ (28)

and $b_1$ and $b_2$ in equation (15) are expressed by the equations:

$b_1 = -(1 - 2^{-(2m+1)});$ and $b_2 = 1 - 2^{-2m}.$ (29)

The aforementioned matters can be summarized as follows:

(i) when the sampling frequency $f_s$ is selected to be six times of the center frequency $f_c$ of the band-pass filter,
(ii) n is 3 or an odd number more than 3,
(iii) $a_0 = 2^{-n}$, $a_1 = 0$, $a_2 = -2^{-n}$,
(iv) $b_1 = -(1 - 2^{-n})$, and
(v) $b_2 = 1 - 2^{-(n-1)}$,
(vi) it follows that the amplitude characteristic $M(\omega_c) = 1$, and
(vii) the delay characteristic $\tau(\omega_c) = (2^n - 2)/f_c.$ (30)

Or the aforementioned matters can be summarized as follows:

(i') when the sampling frequency $f_s$ is selected to be six times of the center frequency $f_c$ of the band-pass filter,
(ii') m is an integer and more than 0,
(iii') $a_0 = 2^{-(2m+1)}$, $a_1 = 0$, $a_2 = -a_0$,
(iv') $b_1 = -(1 + 2^{(2m+1)})$, and
(v') $b_2 = 1 - 2^{-2m}$,
(vi') it follows that the amplitude characteristic $M(\omega_c) = 1$, and
(vii') the delay characteristic $\tau(\omega_c) = (2^{2m} - 1)/3f_c.$ (31)

Thereby, a phase and an amplitude of the center frequency of the input into the filter coincides with those of the output from the filter, respectively.

Since $a_0 = 2^{-(2m+1)}$, an operation of the coefficient can be done by a bit shift, the operation can be easily done with high accuracy due to no coefficient error.

Moreover, as $a_0$ approaches zero, the band of the filter becomes narrow and $a_0$ can be selected in response ro a purpose, thereby a desired band width can be easily obtained.

In the following, the filter 1 according to a first preferred embodiment of the present invention will be explained with reference to FIG. 2.

Figure 2:
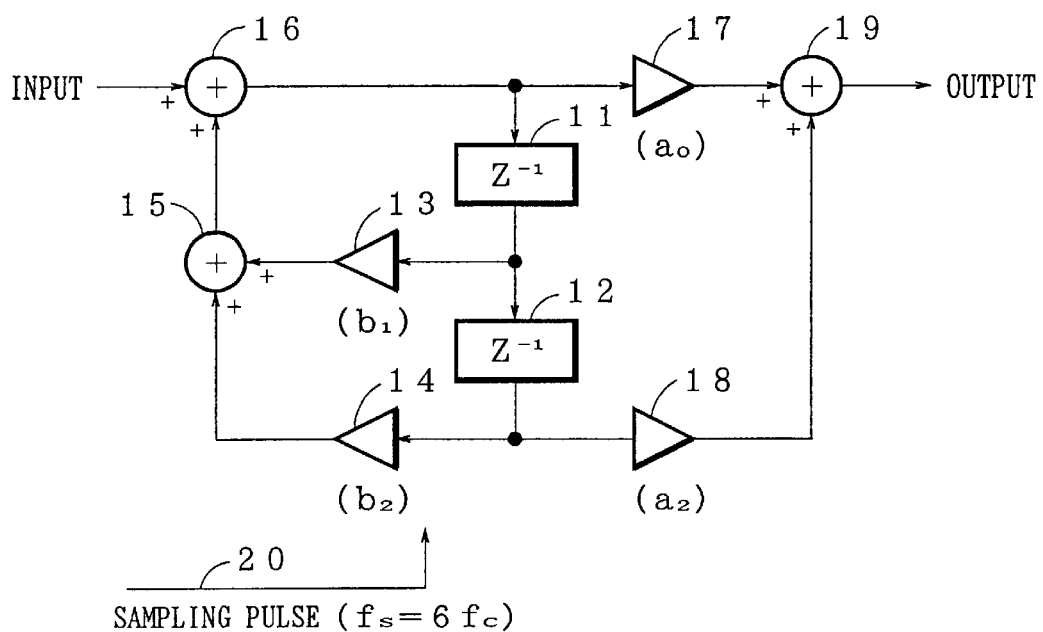
FIG. 2 is a constitution of a filter according to a first embodiment of the present invention.

As shown in FIG. 2, the filter 1 includes delay operators 11 and 12, a first-order input feed back coefficient ($b_1$) 13, a second-order input feed back coefficient ($b_2$) 14, adders 15 and 16, a zero-order output coefficient ($a_0$) 17, a second-order output coefficient ($a_2$) 18, an adder 19, and a sampling pulse 20 for carring out a digital signal processing.

As shown in equation (31), the frequency $f_s$ of the sampling pulse is selected to be six times of a center frequency $f_c$ of the band pass filter.

When n is 3 or an odd number more than 3, the first-order input feed back coefficient ($b_1$) 13 is set to be $-(1-2^{-n})$ and the second-order input feed back coefficient ($b_2$) 14 is set to be $1 - 2^{-(n-1)}$.

The zero-order output coefficient ($a_0$) 17 is set to be $2^{-n}$ and the second-order output coefficient ($a_2$) 18 is set to be $-2^{-n}$.

The filter 1 is operated under these settings, thereby a phase and an amplitude of the input at the center frequency into the filter coincides with those of the output from the filter, respectively.

Moreover, since each coefficient is set to be a power of 2, each coefficient with high accuracy can easily be obtained.

In the following, the filter 1 according to a second preferred embodiment of the present invention will be explained with reference to FIG. 3.

In the first preferred embodiment, the zero-order output coefficient ($a_0$) 17 is set as $a_0 = 2^{-n}$ and the second-order output coefficient ($a_2$) 18 is set as $a_2 = -2^{-n}$.

Therefore, it follows that $a_0 = -a_2$, then an output, in which $a_0$ is multiplied by the zero-order output and $-a_2$ is multiplied by the second-order output, is added at the adder 19, thereby an output signal is obtained.

To the contrary, in the second preferred embodiment of the present invention, the number of times of the multiplication is decresed.

Figure 3:
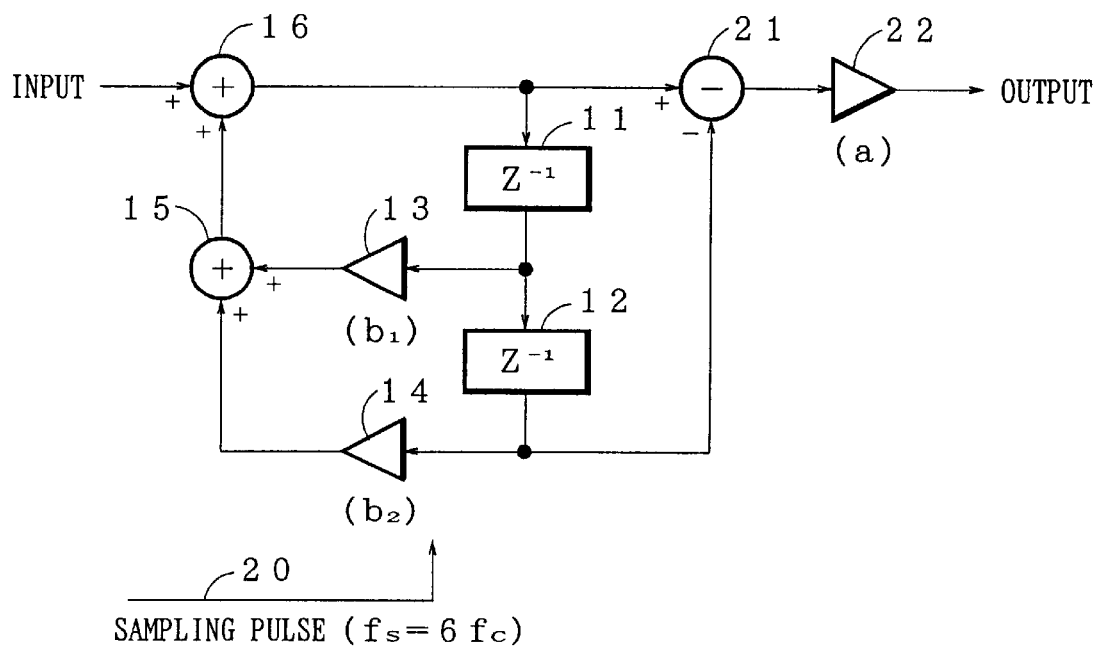
FIG. 3 is a constitution of a filter according to a second embodiment of the present invention.

That is, as shown in FIG. 3, the second-order output is subtracted from the zero-order output at the subtractor 21, then thus subtracted output is multiplied by an output coefficient ($a = 2^{-n}$) 22.

The aforementioned preferred embodiments are described to aid in understanding the present invention and variations may be made by one skilled in the art without departing from the spirit and scope of the present invention.

As explained above, according to the FM multiplex demodulation device of the present invention, the filter is provided, which passes a (L-R) signal multiplexed by a subcarrier at 38 kHz from a composite signal through, a composition ratio between an output signal from the filter and the composite signal is changed in response to a noise level contained in the composite signal so that the multiplexed (L-R) signal is demodulated, thereby the feeling of stereo for the L and R signals can be maintaied excellent and the offensive noise to the ears can be reduced.

Moreover, the composite signal is delayed for a period of time corresponding to a delay time of the filter so as to change the composition ratio, thereby the phase of the filter can coincide with that of the delayed subcarrier.

Furthermore, in the second-order band-pass IIR-type digital filter, the sampling frequency of the digital filter is set to be six times of the center frequency of the pass band, the first-order input feed back coefficient $b_1$ is set to be $-1+2^{-n}$, while the second-order input feed back coefficient $b_2$ is set to be $1-2^{-(n-1)}$, where n is 3 or an odd number more than 3. Thereby, a phase of the input at the center frequency into the filter coincides with that of the output from the filter and the filter can easily be obtained.

Moreover, since each coefficient is set to be a power of 2, each coefficient with high accuracy can easily be obtained.

Furthermore, since the zero-order output coefficient is set to be $2^{-n}$ and the second-order output coefficient is set to be $-2^{-n}$, an amplitude of the input at the center frequency into the filter coincides with that of the output from the filter.

What is claimed is:

1. A frequency modulation multiplex demodulation device comprising:

a filter for selecting a signal multiplexed by a subcarrier at 38 kHz from a composite signal;

a noise detecting section for detecting noises from the composite signal;

a ratio changing section for changing a composition ratio between an output signal from the filter and the composite signal, and for outputting a composed signal, the composition ratio being determined in response to the noises detected by the noise detecting section;

a demodulating section for demodulating the multiplexed signal with multiplying the output signal from the ratio changing section by the subcarrier;

an adding section for adding an output signal from the demodulating section to the composite signal; and a subtracting section for subtracting the output signal from the demodulating section from the composite signal.

2. The frequency modulation multiplex demodulation device according to claim 1, further comprising a delaying section for delaying the composite signal for a period of time corresponding to a delay time of the filter, wherein the delayed signal instead of the composite signal is input to the ratio changing section, the adding section and the subtracting section.

3. The frequency modulation multiplex demodulation device according to claim 1, wherein the filter filters out a part of a multiplexed signal.

4. The frequency modulation multiplex demodulation device according to claim 2, wherein the filter filters out a part of a multiplexed signal.

5. The frequency modulation multiplex demodulation device as claimed in any one of claims 1–4, wherein the filter consists of a second-order band-pass infinite impulse response-type digital filter, a sampling frequency of the digital filter is set to be six times of a center frequency of the pass band, a first-order input feed back coefficient $b_1$ is set as $b_1=-1+2^{-n}$, while a second-order input feed back coefficient $b_2$ is set as $b_2=1-2^{-(n-1)}$, where n is 3 or an odd number more than 3.

6. The frequency modulation multiplex demodulation device according to claim 5, wherein a zero-order output coefficient $a_0$ is set as $a_0=2^{-n}$ and a second-order output coefficient $a_2$ is set as $a_2=-2^{-n}$.

7. The frequency modulation multiplex demodulation device according to claim 5, wherein a second-order output is subtracted from a zero-order output and the resultant output is multiplied by $2^{-n}$.

8. A frequency modulation multiplex demodulating method comprising the steps of:

selecting a signal multiplexed by a subcarrier at 38 kHz from a composite signal by a filter;

detecting noises from the composite signal;

changing a composition ratio between the selected signal by the filter and the composite signal, and outputting a composed signal, the composition ratio being determined in response to the detected noises;

demodulating the multiplexed signal with multiplying the composed signal by the subcarrier;

adding the demodulated signal to the composite signal; and subtracting the demodulated signal from the composite signal.

* * * * *